(12) United States Patent
Xu et al.

(10) Patent No.: US 8,241,050 B2
(45) Date of Patent: Aug. 14, 2012

(54) DOCKING CRADLE WITH FLOATING CONNECTOR ASSEMBLY

(75) Inventors: Bo Xu, Mississauga (CA); Yanmin Mao, Brampton (CA)

(73) Assignee: Psion Inc., Mississauga, Ontario (CA)

( * ) Notice: Subject to any disclaimer, the term of this patent is extended or adjusted under 35 U.S.C. 154(b) by 243 days.

(21) Appl. No.: 12/765,984

(22) Filed: Apr. 23, 2010

(65) Prior Publication Data

US 2011/0261509 A1 Oct. 27, 2011

(51) Int. Cl.
*H01R 13/64* (2006.01)
(52) U.S. Cl. ...................................................... 439/247
(58) Field of Classification Search .................. 439/247, 439/289, 378, 350, 248
See application file for complete search history.

(56) References Cited

U.S. PATENT DOCUMENTS

| 6,830,469 | B1 * | 12/2004 | Doyle et al. | 439/247 |
| 7,524,197 | B2 * | 4/2009 | Mills et al. | 439/131 |
| 2010/0102777 | A1 * | 4/2010 | Sa | 320/115 |
| 2011/0134601 | A1 * | 6/2011 | Sa | 361/679.43 |
| 2011/0175408 | A1 * | 7/2011 | Ridler et al. | 297/188.16 |
| 2012/0030393 | A1 * | 2/2012 | Ganesh et al. | 710/303 |

* cited by examiner

*Primary Examiner* — Jean F Duverne
(74) *Attorney, Agent, or Firm* — Perry + Currier, Inc.

(57) ABSTRACT

A docking cradle for a portable electronic device has a floating connector assembly which isolates a portable electronic device connected to the connector assembly from at least some of the shock, vibration or other motion imposed on the rest of the docking cradle. The connector assembly is positioned above a base frame and comprises a platform, a device interface on the platform, a device securing mechanism connected to the platform and connectable to the portable electronic device to physically secure the portable electronic device to the connector assembly; and at least one connector assembly spring connecting the connector assembly to the base frame such that the connector assembly is movable laterally relative to the base frame.

15 Claims, 12 Drawing Sheets

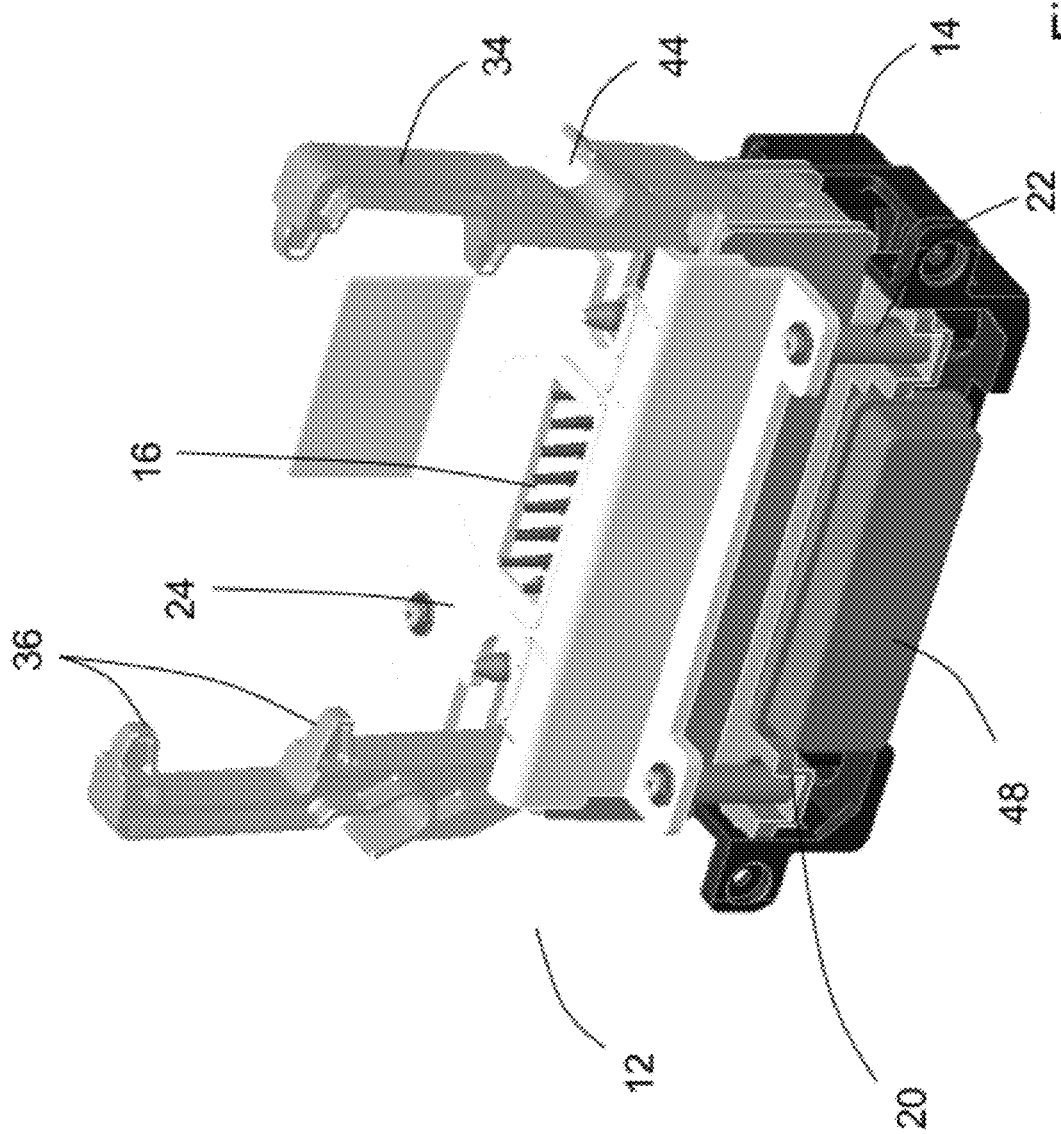

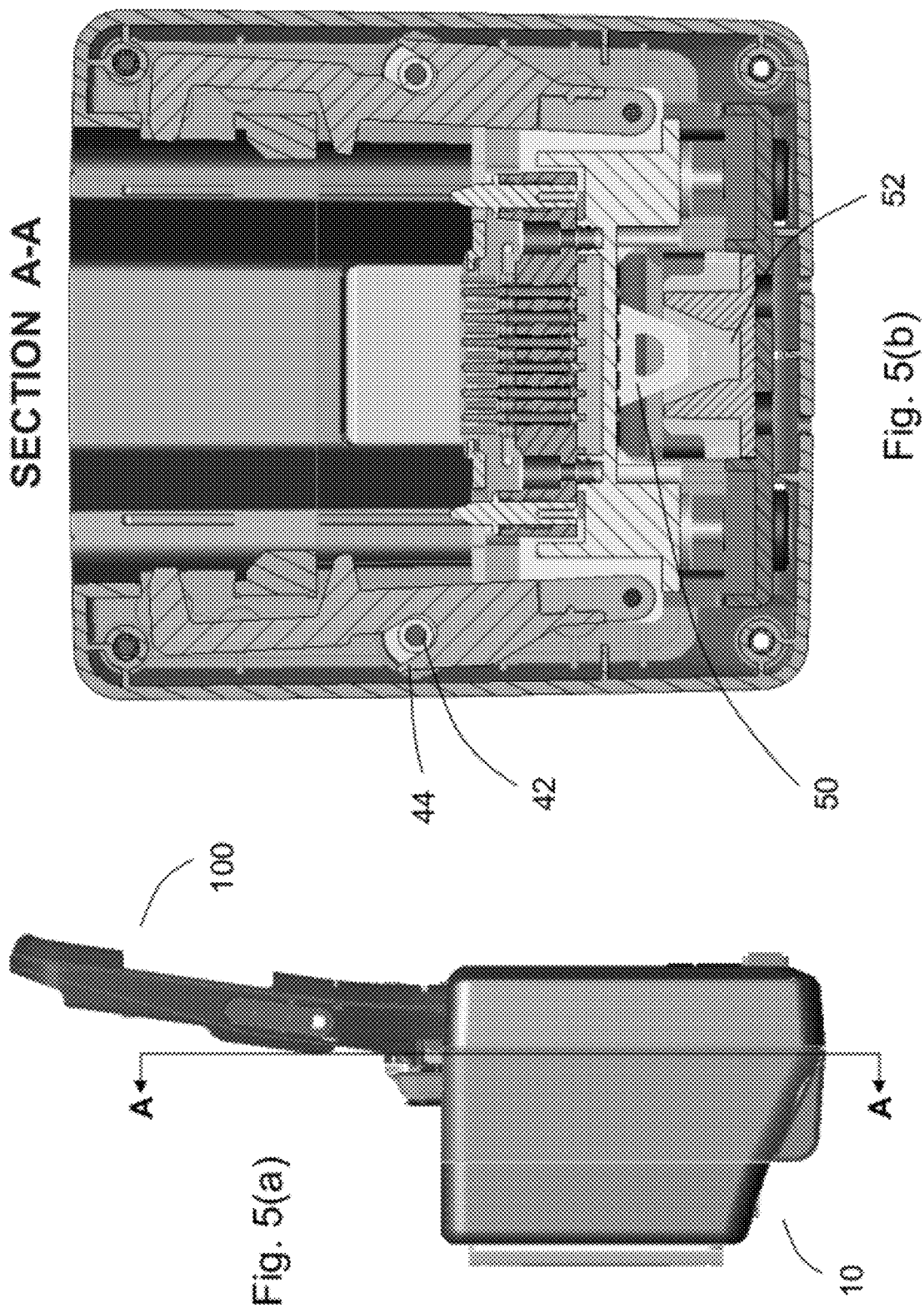

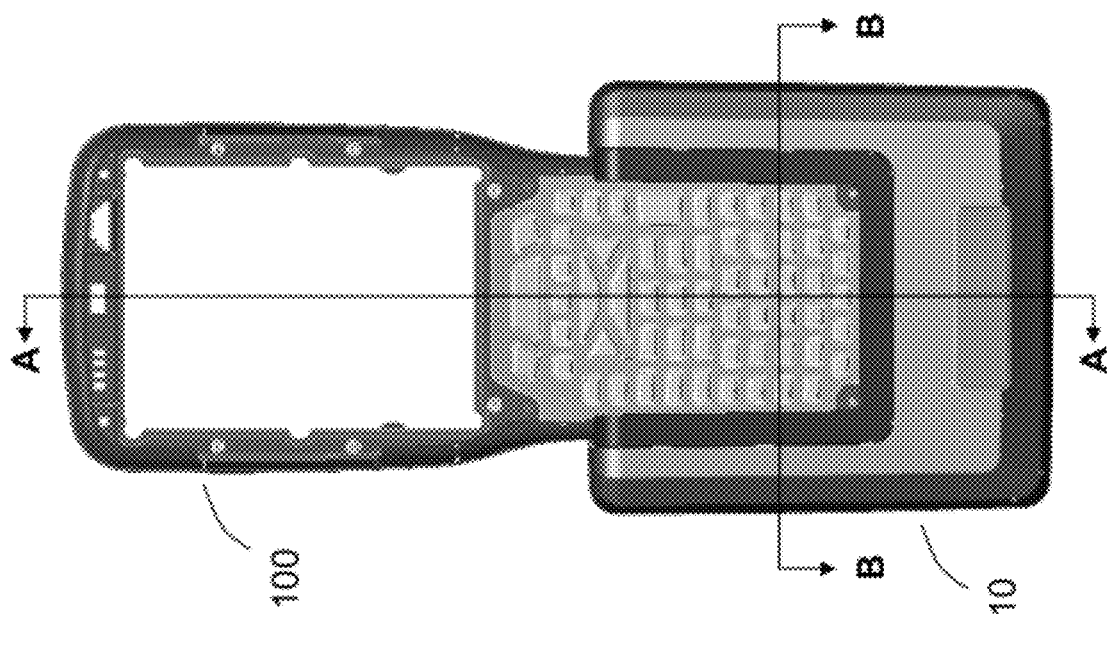

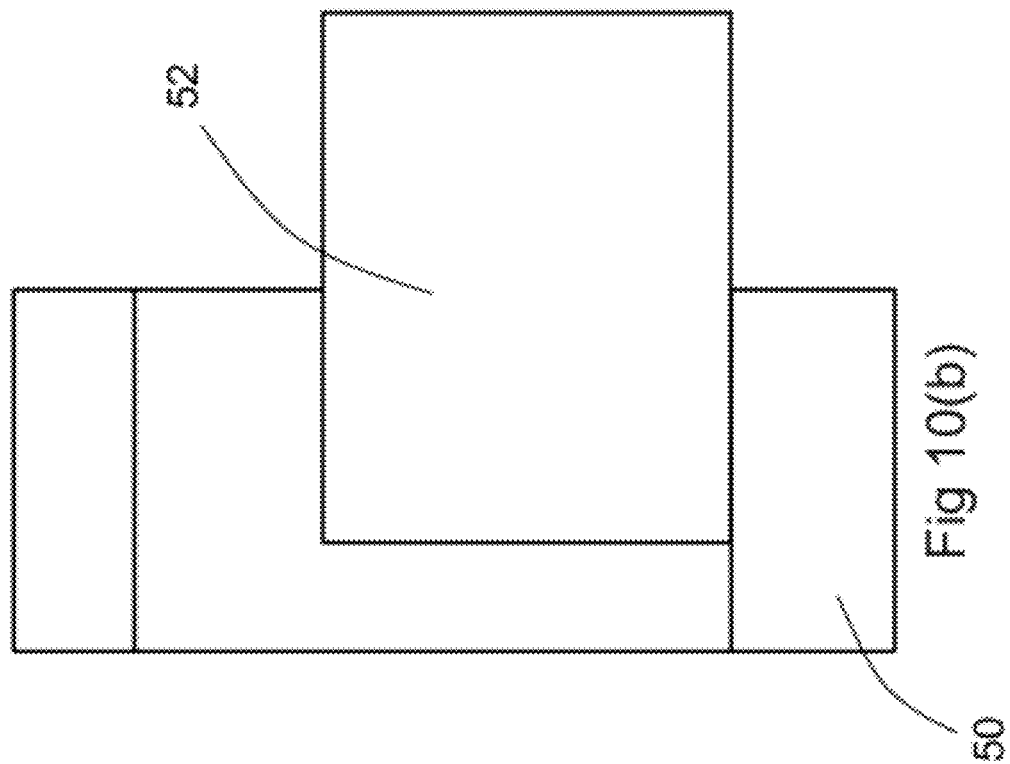
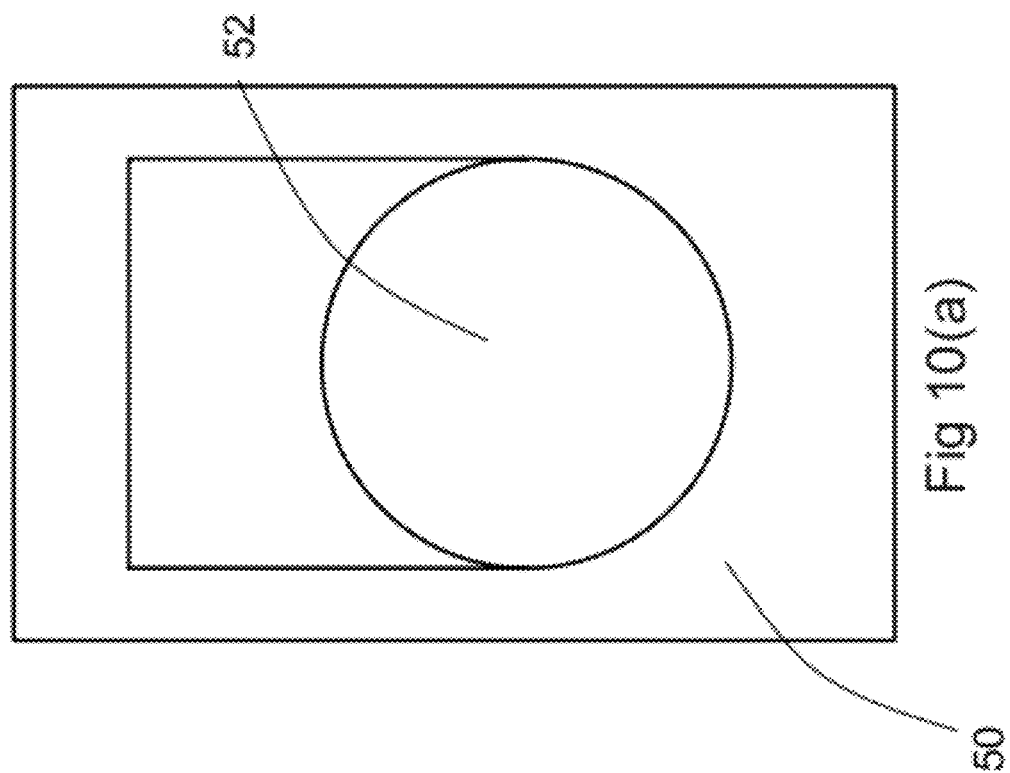

DOCKING CRADLE WITH FLOATING CONNECTOR ASSEMBLY

This invention relates generally to a docking cradle for a portable electronic device and having a floating connector assembly.

BACKGROUND

Portable electronic devices such as handheld computing and communication devices have fragile electronic components such as circuit boards, processors, and liquid crystal display screens. While it is preferable to treat electronic devices with care, this is not possible when the electronic devices must be exposed to hostile environments or used in applications where rough treatment is unavoidable. For example, mobile computing devices are used at ports, warehouses, freezers, factories, delivery vans and airports—working all day in environments like these, mobile computing devices can get dropped, bumped, sprayed, chilled and generally abused.

There are a class of "rugged" portable electronic devices that are designed to withstand rough treatment and hostile environments. Some design approaches for a rugged electronic device include using fewer case pieces and reducing seams and seals to reduce penetration of water and dust, integrating antennas into the body of the device, increasing the space between internal components to improve shock and vibration resistance, placing display screens inside a thermoplastic elastomer boot to seal it to the device and to protect it from vibration and shock, and for devices which are operated in extremely cold conditions, including a heating element to minimize condensation. Of course, selecting durable materials also contribute to a more rugged device; the device casing can be made from an combination of ABS and polycarbonate that is resistant to stress cracking, and to surround the device with shock absorbent materials.

While efforts can be made to design and build the portable electronic device to be rugged, such devices can still be susceptible to damage due to shock and vibration. Also, shock or vibration or other motion can cause the portable electronic device that is docked in a docking cradle to become dislodged. This can cause the portable electronic device to become disconnected from the power and communications interface of the docking cradle, and worse, the portable electronic device could shake within the cradle or fall out of cradle and become damaged. Docking cradles mounted in vehicles or in other high vibration environments such as manufacturing plants are particularly of concern.

SUMMARY

According to one aspect of the invention, there is provided a docking cradle for a portable electronic device having an electrical interface, the docking cradle comprising: a base frame; and a connector assembly positioned above the base frame and comprising a platform, an electrical interface on the platform connectable with the electrical interface of the electronic device, a device securing mechanism connected to the platform and connectable to the electronic device to physically secure the electronic device to the connector assembly such that the device and docking cradle electrical interfaces are maintained in contact. The docking cradle also comprises at least one connector assembly spring connecting the connector assembly to the base frame such that the connector assembly is movable relative to the base frame.

The connector assembly spring can connect the connector assembly to the base frame such that the connector assembly is movable between an elevated elevation and a depressed elevation. The docking cradle in this case further comprises a locking mechanism connected to the base frame and connectable to the connector assembly to restrict the connector assembly to only roll or pitch or both relative to the base frame when at the depressed elevation.

The locking mechanism can comprise a laterally movable engagement tab and the connector assembly can comprises an engagement bracket. The engagement bracket is vertically aligned with the tab when the connector assembly is in the depressed elevation, and the connector assembly is locked in the depressed position when the tab is moved laterally to engage with the aligned engagement bracket. The locking mechanism can further comprises a spring connecting the locking mechanism to the base frame, and laterally biasing the tab against engagement bracket, such that when engagement bracket is vertically aligned with the tab, the spring moves the tab into engagement with the engagement bracket. The locking mechanism cam further comprise a push button extending through an opening in the housing and which is pushable to disengage the tab from the engagement bracket. The engagement bracket and tab can have a matching curved profile such that the engagement bracket can roll relative to the tab when the tab is engagement with the engagement bracket.

According to another aspect of the invention, there is provided a docking cradle for a portable electronic device having an electrical interface. The docking cradle comprises a base frame and a connector assembly positioned above and connected to the base frame and movable between an elevated elevation and a depressed elevation relative to the base frame. The base frame and connector assembly can be connected by a spring such that the connector assembly is vertically movable between its elevated and depressed elevations. The connector assembly comprises a platform, an electrical interface on the platform for connecting to the electrical interface on the electronic device, and a device securing mechanism comprising at least two longitudinally extending and laterally spaced locking arms each having at least one inwardly facing tooth. The locking arms are each pivotably coupled to the platform and biased into an unlocked position when the connector assembly is in its elevated elevation such that the electronic device is insertable between the locking arms and the electrical interfaces of the electronic device and connector assembly connect, and biased into a locked position when the connector assembly is in its depressed elevation such that the at least one tooth of each locking arm contacts the electronic device thereby securing the electronic device to the connector assembly.

BRIEF DESCRIPTION OF DRAWINGS

FIG. 3 is a front perspective view of some docking components of the docking cradle.

FIG. 5(a) is a side elevation view of the docking cradle in an unlocked position and the portable electronic device in a docked but unconnected position, and FIG. 5(b) is a sectioned view of the docking cradle along section lines A-A.

FIG. 8(a) is a front view of the docking cradle in the locked position and the portable electronic device in the docked and connected position.

FIGS. 10(a) and (b) are respective front and side sectioned views of another embodiment of the engagement tab of the docking cradle connected to the engagement bracket of the docking cradle.

DETAILED DESCRIPTION OF EMBODIMENTS OF THE INVENTION

Directional terms such as "top", "bottom", and "upwards" are used in the following description for the purpose of providing relative reference only, and are not intended to suggest any limitations on how any apparatus is to be positioned during use, or to be mounted in an assembly or relative to an environment.

According to one embodiment of the invention and referring to FIGS. 1 to 8(c), there is provided a docking cradle 10 for a portable electronic device such as a mobile computer 100.

Mobile Computer

Figure 1B:
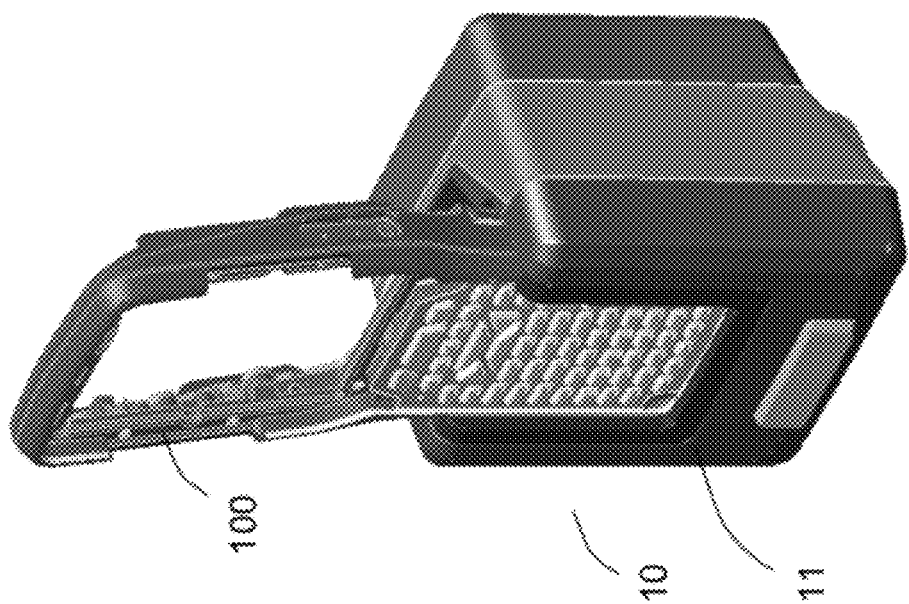
FIGS. 1(a) and (b) are respective front and rear perspective views of a docking cradle according to one embodiment of the invention and a portable electronic device docked in the docking cradle.
Figure 1A:
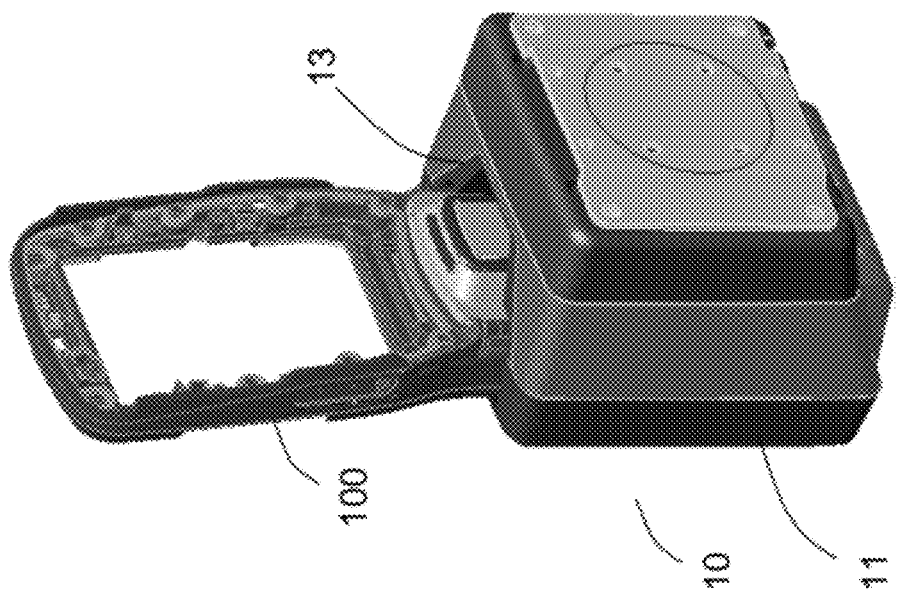
Figure 2:
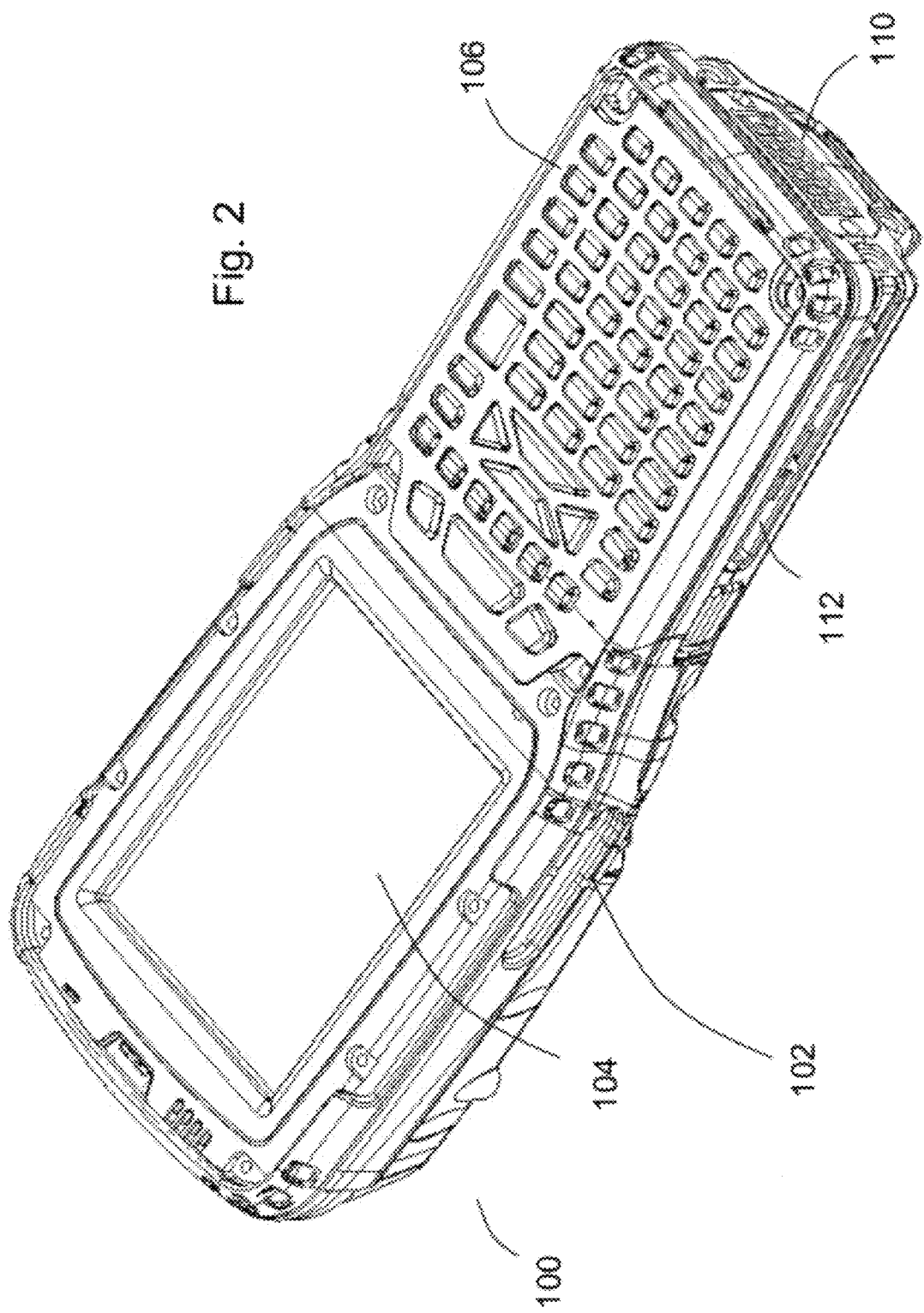
FIG. 2 is a perspective view of the portable electronic device.
Figure 4B:
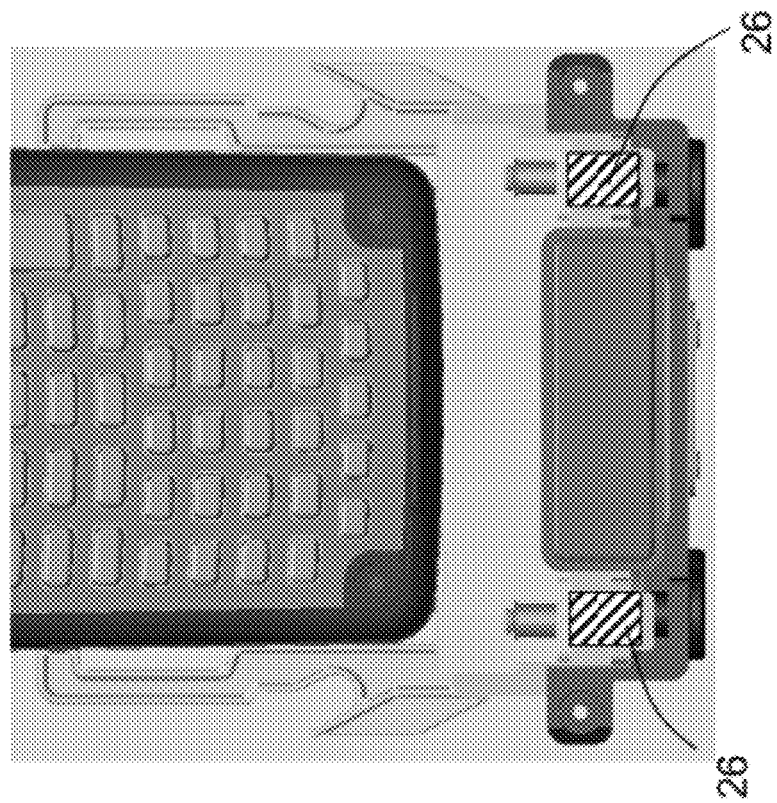
FIG. 4(b) is a front view of the portable electronic device in a docked and connected position and the docking components in a locked position.
Figure 4A:
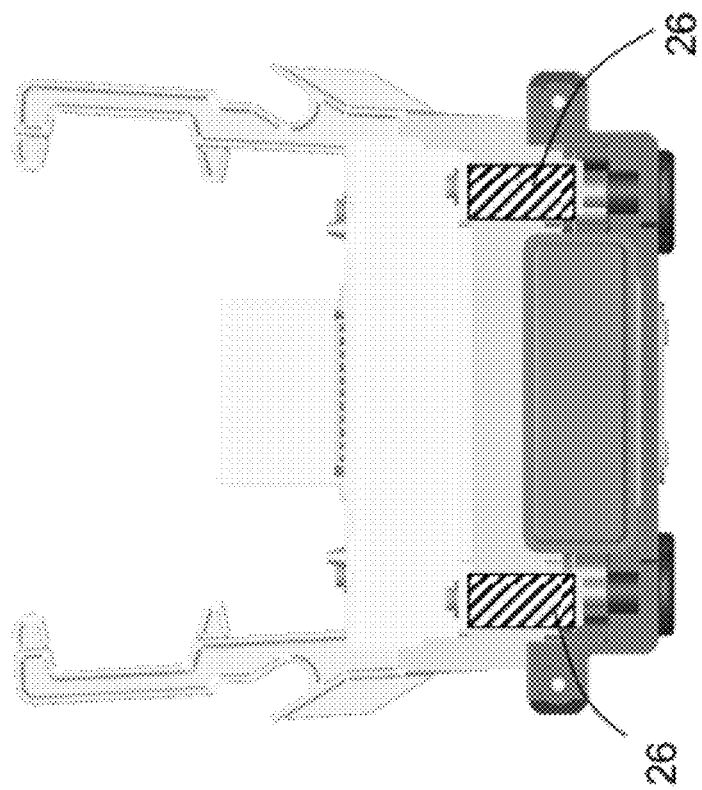
FIG. 4(a) is a front view of the docking components positioned in an unlocked position.

As shown in FIGS. 1 and 2, the mobile computer 100 (herein referred to variously and interchangeably as a portable electronic device, a handheld device, a handheld computer, or a mobile device) comprises a main body 102, a display 104, and a keyboard 106. An electrical interface 110 for receiving power and exchanging data (hereinafter "mobile computer electrical interface") is provided at the bottom of the mobile computer 100 for connecting to a corresponding interface in the docking cradle 10 ("hereinafter "docking cradle electrical interface"), and a side rail 112 is located on each side of mobile computer 100 and provided with a pair of recesses for engaging with securing means of the docking cradle 10. The side rails 112 are made of a durable material such as metal and are removable from the mobile computer 100 and replaceable by new side rails when worn out.

Additionally, in the present embodiment, the mobile computer 100 has the capability of wireless communicating data and/or voice, to and from servers as well as data acquisition sources within a communication network. A circuit board (not shown) is housed within the mobile computer 100 for providing the electronic components required to implement at least a portion of the functionality provided by the mobile computer 100.

The circuit board includes a microprocessor (not shown), which controls general operation of the mobile computer 100. The microprocessor also interacts with functional device subsystems such as a communication subsystem, display module, a flash memory, random access memory (RAM), auxiliary input/output (I/O) subsystems, serial port, keyboard 106, speaker, microphone, short-range communications subsystem such as Bluetooth™ for example, and Universal Serial Bus (USB) expansion port for peripherals (all not shown). The mobile computer 100 may include a power source, such as a rechargeable battery which may also be removable and replaceable from the mobile computer. The mobile computer 100 may also include a positioning device (not shown), such as a GPS receiver for example, for receiving positioning information.

Operating system software used by the microprocessor may be stored in a persistent store such as the flash memory, which may alternatively be a read-only memory (ROM) or similar storage element (not shown). Those skilled in the art will appreciate that the operating system, specific device applications, or parts thereof, may be temporarily loaded into a volatile store such as RAM.

The microprocessor, in addition to its operating system functions, enables execution of software applications on the mobile computer 100. A predetermined set of applications, which control basic device operations, may be installed on the mobile computer 100 during its manufacture. These basic operations typically include data and voice communication applications, for example.

The display 104 is used to visually present an application's graphical user interface (GUI) to the user. Depending on the type of mobile computer 100, the user may have access to various types of input devices, such as, for example, a scroll wheel, trackball, light pen and/or a touch sensitive screen.

Docking Cradle

Referring now to FIGS. 3 to 8, the docking cradle 10 has a housing 11 which houses a floating connector assembly 12 and a base frame 14. The connector assembly 12 has a device securing mechanism for physically securing the mobile computer 100 in place and a docking cradle electrical interface 16 for supplying power to and being communicative with the mobile computer 100. The base frame 14 is fixed to the bottom of the housing 11. The connector assembly 12 is connected to the base frame 14 by springs such that the connector assembly 12 is movable within the housing 11 relative to the base frame 14 thereby isolating the mobile computer 100 docked in the connector assembly 12 from at least some shock, vibration or other motion encountered by the rest of the docking cradle 10.

The connector assembly 12 has a platform 20 from which four support plate guide posts 22 extend vertically upwards. A mobile computer support plate 24 extends parallel to and above the platform 20 and has four openings which each receive one guide post 22 such that the support plate 24 is movable vertically relative to the platform 20. A set of four support plate coil springs 26 (shown in FIG. 4) are provided to bias the support plate 24 in an elevated position and allow the support plate 24 to move between the elevated position and a depressed position relative to the platform 20; each support plate coil spring 26 extends around each guide post 22 and between the platform 20 and the support plate 24. While four guide posts and associated coil springs are shown in this embodiment, a different number or type of springs 26 can be used to bias the support plate 24 against the platform 20, such as one or more leaf springs.

Figure 6A:
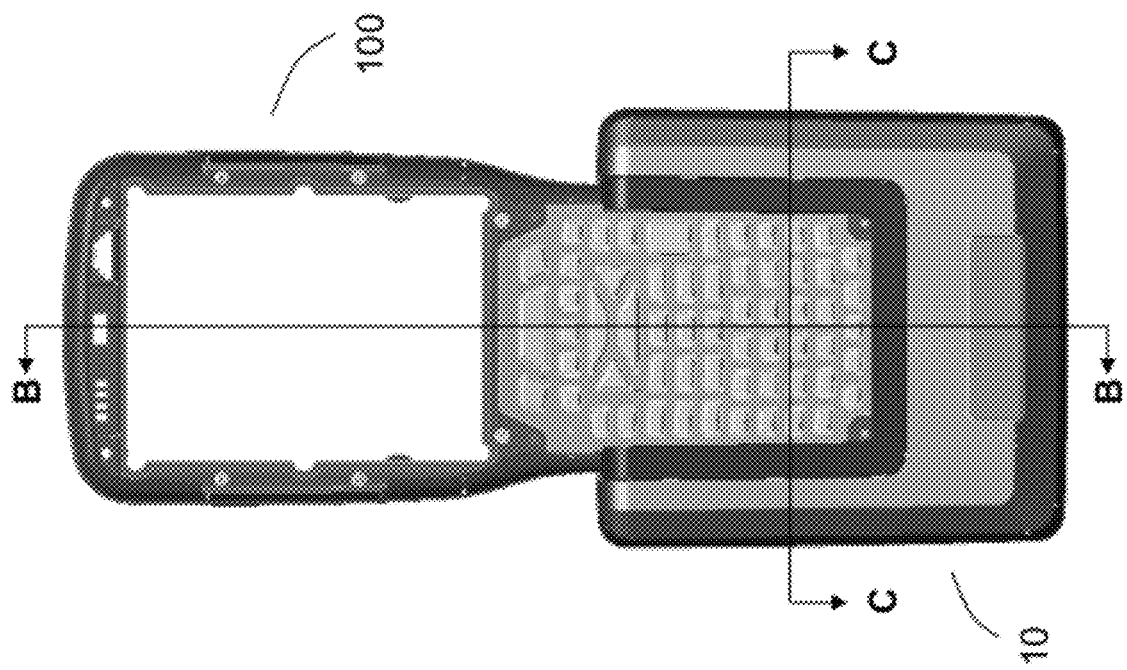
FIG. 6(a) is a front view of the docking cradle in the unlocked position and the portable electronic device in the docked but unconnected position.
Figure 6C:
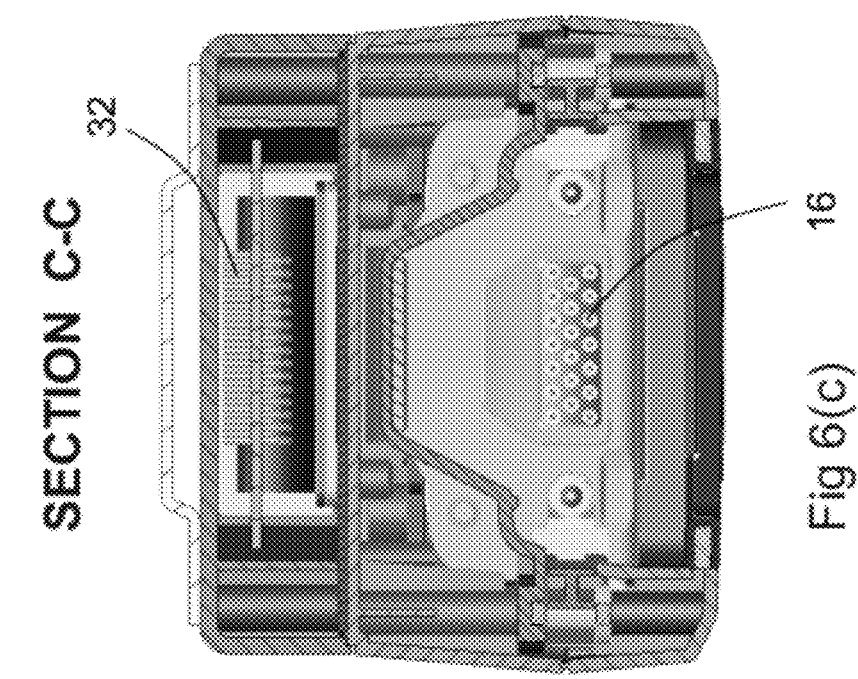
FIGS. 6(b) and 6(c) are respective sectioned views of the cradle along section lines B-B and C-C.

The support plate 24 has a central interface opening for providing access between the mobile computer electrical interface 110 and the docking cradle electrical interface 16. The docking cradle electrical interface 16 in this embodiment are a series of spring-loaded pogo pins arranged in a rectangular array and disposed centrally on the platform 20 in alignment with the central interface opening, as shown in detail in FIG. 6(*c*). As shown in FIG. 6(*b*), a data cable 30 communicatively connects the docking cradle electrical interface 16 with a data port 32 on the bottom rear of the docking cradle housing 11. A communications cable (not shown) can be connected to this data port 32 and a power source (not shown) to provide power to the mobile computer 100 and/or to a computer (not shown) to transfer data to and from the mobile computer 100.

The device securing mechanism in this embodiment comprise the support plate 24 and a pair of locking arms 34 pivotally coupled to each side of the platform 20. The locking arms 34 extend longitudinally in a generally upward direction from the platform 20 and above the support plate 24. Each locking arm 34 has a pair of longitudinally-spaced locking teeth 36 which extend laterally inwards from the locking arm 34, and which engage a corresponding recess in the side rail 112 of the mobile computer 100. The longitudinal spacing between the teeth increases the stability of the connection between the device securing mechanism and the mobile computer 100; that is, by spacing apart the two points of contact by each pair of teeth against a corresponding side rail 112, there is a reduced tendency for the mobile computer to roll relative to the locking arms 34. As can be seen in FIGS. 5(*b*) and 7(*b*), the longitudinal spacing between teeth is maximized within the limited confines of the housing 11. While two teeth 36 are shown for each arm 34 in this embodiment, a different number of teeth 36 and a corresponding number of recesses in the side 112 rail can be alternatively provided with suitable spacing between the outermost pair of teeth to provide stability and reduce the tendency for the mobile computer to roll relative to the locking arms. In yet another alternative embodiment, each locking arm 34 can be provided with a single tooth (not shown) having a longitudinally elongated base which engages a correspondingly elongated recess in a side rail (not shown); the length of the tooth base should be similar to the longitudinal spacing of the pair of teeth in the illustrated embodiment to provide similar stability.

Figure 6B:
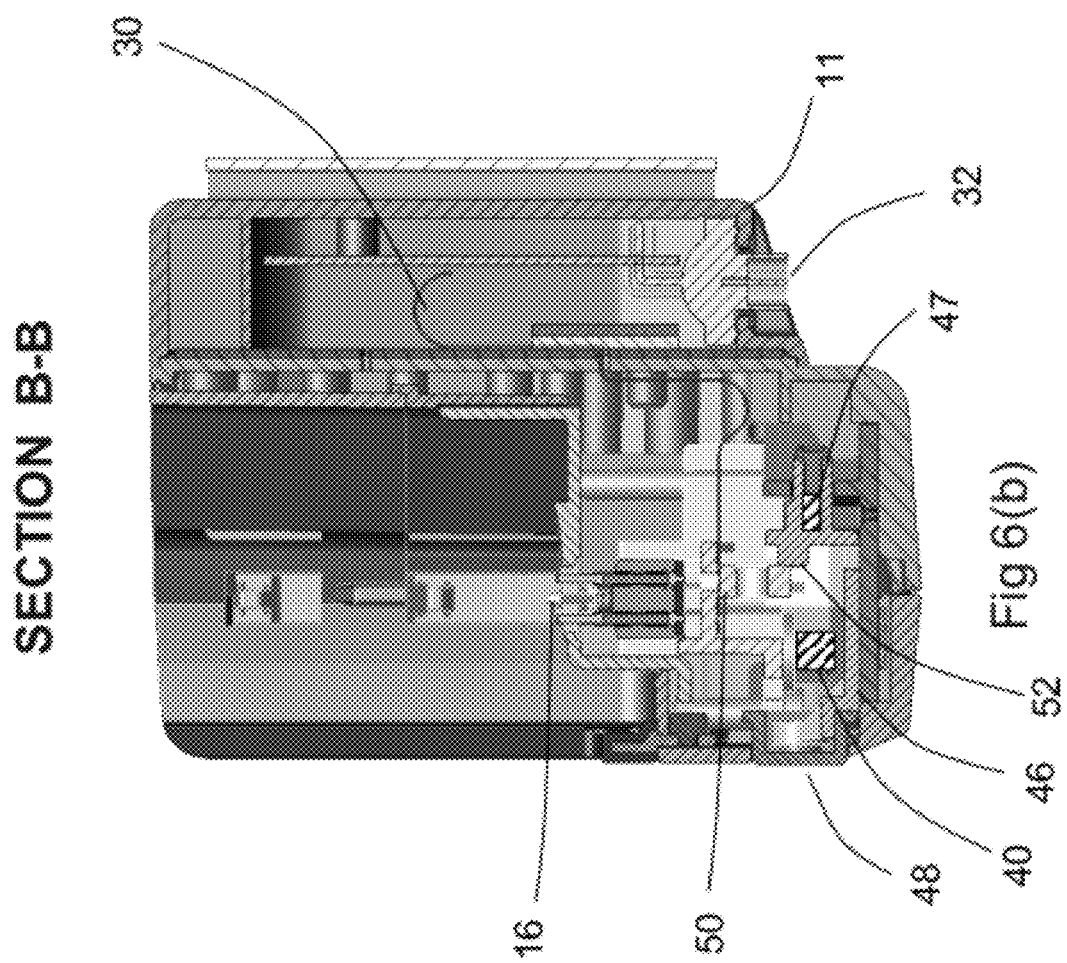

The housing 11 has a receptacle 13 which extends inwards from the top and side of the housing 11. The locking arms 34 are located at each side of the receptacle 13 and are pivotable between a locked and unlocked position. FIGS. 3 to 6 show the locking arms 34 in the unlocked position and FIGS. 7 and 8 show the locking arms 34 in a locked position and securing the mobile computer 100. When in the unlocked position, the locking arms 34 are pivoted laterally outwards enough (i.e. away from the receptacle 13) that the mobile device 100 can be inserted into the receptacle 13 and onto the support plate 24 located at the bottom of the receptacle 13. When in the locked position, the locking arms 34 are pivoted laterally inwards (i.e. towards the receptacle 13) that the locking teeth 36 securely engage the recesses of the side rails 112 of the mobile computer 100, thereby physically securing the mobile computer 100 in the connector assembly 12.

As shown in FIG. 6(*b*) the connector assembly 12 is vertically suspended on the base frame 14 by a set of four connector assembly coil springs 40 located between the bottom surface of the platform 20 and the top surface of the base frame 14. The connector assembly coil springs 40 enable the connector assembly 12 to move between an elevated position and a depressed position in the receptacle 13 and relative to the base frame 14, and which bias the connector assembly 12 in the elevated position. There is enough space within the housing 11 and enough compliance in the springs 40 that when the connector assembly 12 is in the depressed position it can roll and pitch (i.e. rotate front and back and side to side) within the housing 11 and relative to the base frame 14. This is particularly useful to allow the connector assembly to isolate the mobile computer 100 from some of the shock, vibration and motion transmitted to the docking cradle 10. While four coil springs 40 are in this embodiment, a different number or type of springs 40 can be used to bias the connector assembly 12 against the base frame 14, such as one or more leaf springs As visible in FIGS. 5(*b*) and 7(*b*), a pair of cam pins 42 are mounted (or built in as part of the housing) on the inside back surface of the housing 11 with each cam pin 44 located on the outboard side of a respective locking arm 34 and extending horizontally forwards. Each locking arm 34 has a cam slot 44 which engages one respective cam pin 42 and which is positioned at an angle on the locking arm 34 such that when the connector assembly 12 is in its elevated position the cam pin 42 and cam slot 44 guide the locking arm 34 into the unlocked position as shown in FIG. 5(*b*), and when the connector assembly 12 is in its depressed position the cam pin 42 and cam slot 44 guide the locking arm 34 into the locked position as shown in FIG. 7(*b*).

Optionally, a coil spring (not shown) can be mounted at each pivot 45 which pivotably couples the locking arm 34 to the connector assembly. The coil spring biases the locking arms 34 into their locked position, and contributes to the clamping force exerted by the locking arms 34 against the side rails 112.

Alternatively, the device securing mechanism can feature only the coil springs and no cam pin and cam slot; in such case, the housing is formed so that the locking arms will be guided into their unlocked position when the connector assembly 12 is moved into its elevated position, and the coil springs only will bias the locking arms 34 into their locked position when the connector assembly 12 is moved into its depressed position.

The collective stiffness of the support plate coil springs 26 and connector assembly coil springs 40 are selected to support the weight of the mobile computer 100, i.e. when the mobile computer 100 is inserted into the receptacle 13 and placed onto the support plate 24, the support plate 24 and connector assembly 12 remain in their elevated positions. In this position ("unconnected unlocked position") the locking arms 34 remain in their unlocked position and the mobile computer electrical interface 110 and interface 16 are not in contact. This position can be useful to a user who simply wishes to store the mobile computer 100 in the docking cradle without charging the mobile computer 100 or initiating a data transfer.

The collective stiffness of the support plate coil springs 26 are selected to be less than the collective stiffness of the connector assembly coil springs 40 so that when the mobile computer 100 is inserted into the receptacle 13 and sufficient downwards force is exerted by the user, the cover plate 24 will depress relative to the platform 20 before the connector assembly 12 will depress relative to the base frame 14; this ensures that the pogo pins of the docking cradle electrical interface 16 extend through the connector opening when the support plate 24 is depressed and the mobile computer electrical interface 110 and docking cradle electrical interface 16 establish a firm connection before the locking arms 34 pivot inwards to clamp the mobile computer 100. To elaborate, when the user exerts enough downward force to overcome the stiffness of the support plate coil springs 26, the cover plate 24 and mobile computer 100 will move downwards in the receptacle 13 until the mobile computer electrical interface 110 contacts the pogo pins of the docking cradle electrical interface 16. The springs of each pogo pin ensures that there is a secure connection with the mobile computer electrical interface 110. This position is hereinafter referred to as the "intermediate position".

When the support plate 24 hits a hard stop on the connector assembly 12, the downwards force exerted by the user starts pushing directly on the connector assembly, thereby compressing the springs 40 directly and forcing the connector assembly 12 to move downwards. The connector assembly 12 and mobile computer 100 will move downwards in the receptacle 13 and the locking arms 34 will be guided by their respective cams 42 and pivot from their unlocked position to their locked position until the locking teeth 36 securely engages the side rails 110 of the mobile computer 112. This position is hereinafter referred to as the "connected locked position", and in this position the mobile computer electrical interface 110 and docking cradle electrical interface 16 are connected, and the locking arms securely fasten the mobile computer 100 to the connector assembly 12.

Figure 7B:
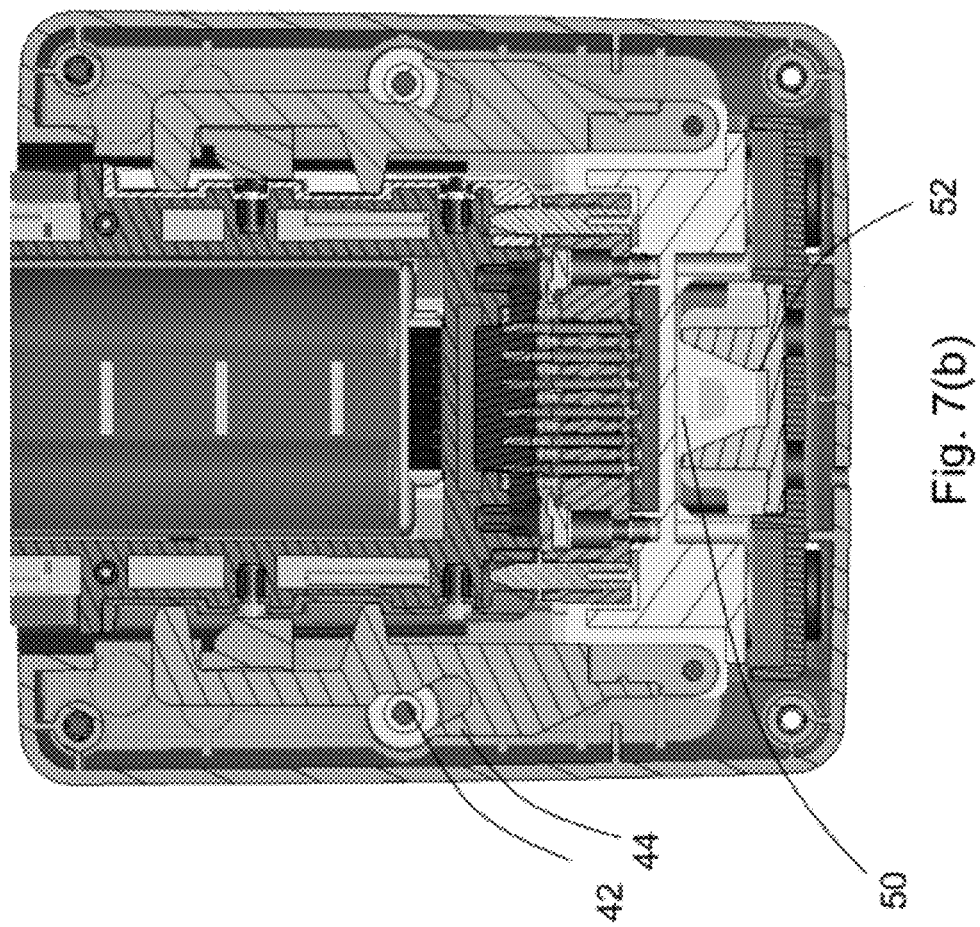
FIG. 7(b) is a sectioned view of the docking cradle along section lines A-A.
Figure 7A:
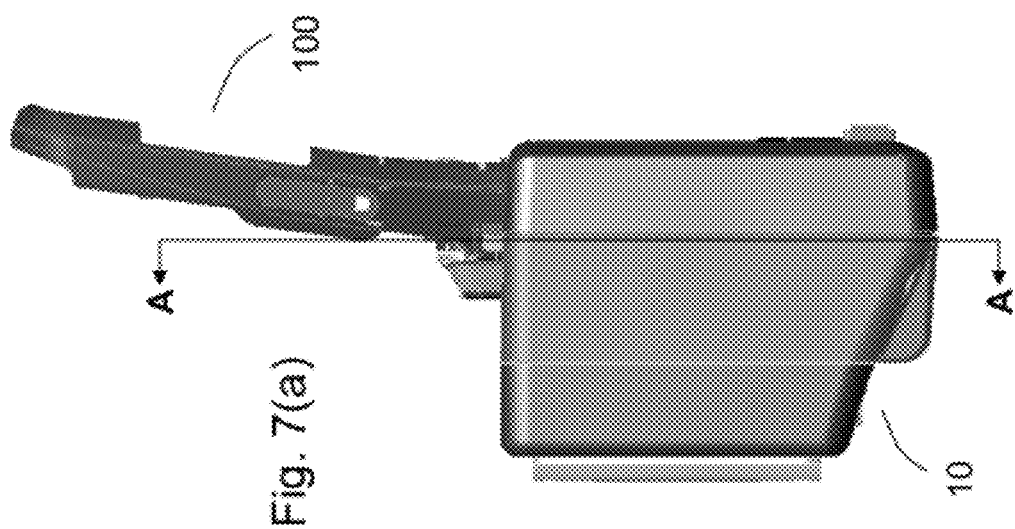
FIG. 7(a) is a side elevation view of the docking cradle in a locked position and the portable electronic device in a docked and connected position.

As can be seen in FIG. 7(b), the recesses in the side rails 110 are positioned on the mobile device 100 such that when the locking arms 34 clamp onto the mobile computer 100, the bottom locking tooth 36 of each locking arm 34 abuts against the bottom edge of the bottom recess in each side rail; this prevents the mobile computer from moving upwards relative to the connector assembly 12 when the locking arms 34 are in their locked position. As the support plate coil springs 26 are compressed in this position, the support plate 24 exerts upwards pressure against mobile computer 100 and causes the bottom edge of the bottom recess to abut against the bottom locking tooth 36 of each locking arm, thereby securing the mobile computer 100 to the connector assembly 12 in the vertical direction. The connector assembly 12 can be designed so that the support plate coil springs 26 are relatively highly compressed (e.g. at or above 80%) when the mobile computer 100 and connector assembly 12 are in the connected locked position; this reduces the ability of the mobile computer 100 to move vertically relative to the connector assembly 12 when in the connected locked position and thus results in the mobile computer 100 being relatively securely fastened to the connector assembly 12 in the vertical direction.

When locked by the locking arms 34, the mobile computer 100 is also relatively securely fastened to the connector assembly 12 in the lateral direction and is relatively resistant to tipping (i.e. yaw, pitch or roll) in the connector assembly 12. This is because when the connector assembly 12 is in the locked position, the cams 42 prevent the locking arms 34 from moving laterally outwards and thus there is continuous inwards pressure exerted by the locking teeth 36 against the side rails 112 of the mobile computer 100. Further, the longitudinally spaced pair of locking teeth 36 impede the mobile computer 100 from rolling and pitching, and the engagement of the teeth 36 against the recesses of the side rails 112 impede the mobile computer 100 from yawing.

Figure 8C:
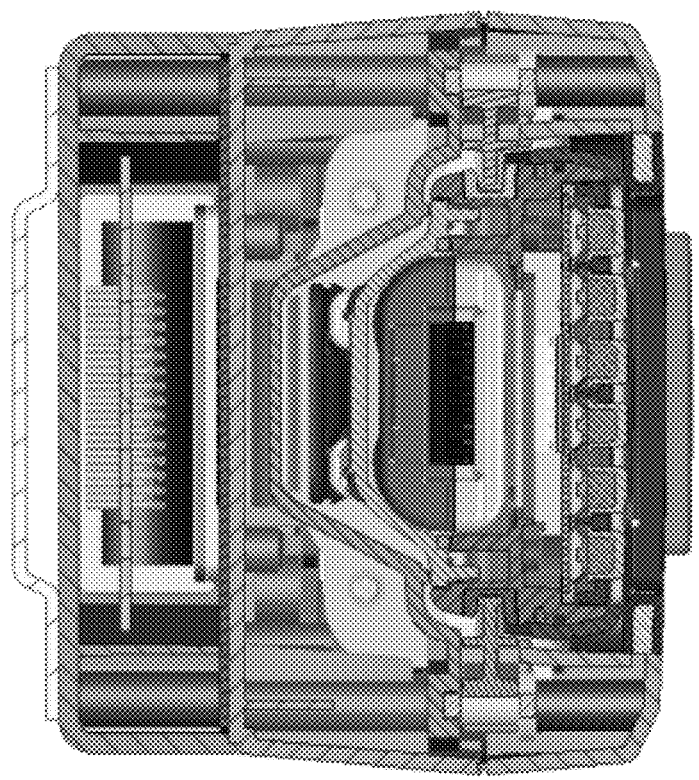
FIGS. 8(b) and 8(c) are respective sectioned views of the cradle along section lines B-B and C-C.
Figure 8B:
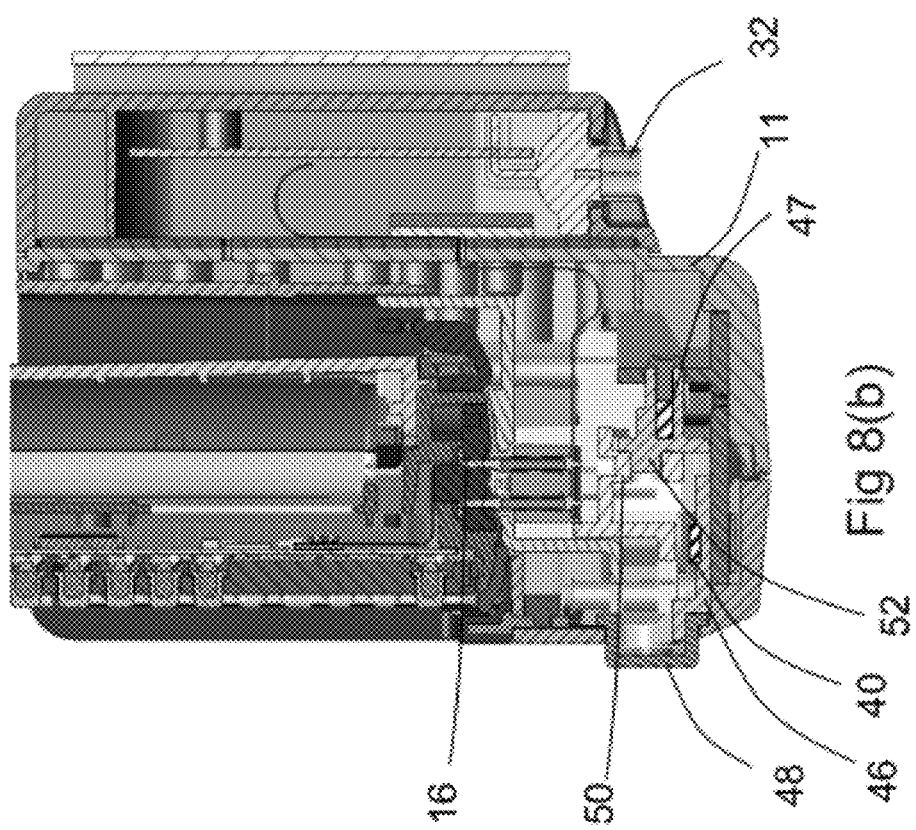

Referring now to FIG. 8(b), a connector assembly locking mechanism 46 is provided to maintain the connector assembly 12 in the connected locked position relative to the base frame 14, and to keep the mobile computer 100 locked and connected to the connector assembly 12. The locking mechanism 46 is located inside the housing 11 and is sandwiched between the connector assembly 12 and base frame 14. The locking mechanism is slidable fore and aft within the housing 11 between an extended and recessed position. A laterally disposed locking mechanism spring 47 is located between the locking mechanism 46 and a part of the base frame 14 and serves to bias the locking mechanism 46 towards its extended position, i.e. towards the front of the housing 11. A button opening is provided in the front of the housing 11 and is aligned with the locking mechanism 46. A push button 48 is connected to the locking mechanism 46 and partially extends through the button opening; the push button 48 has an annular lip inside the housing 11 and which is larger than the button opening thereby preventing the push button 48 from extending completely through the button opening. The push button 48 can be pushed to move the locking mechanism from its extended position to its recessed position. As the locking mechanism 46 is biased by the locking mechanism spring 47, releasing the push button 48 will cause the locking mechanism 46 to revert back to its extended position.

The bottom of a connector assembly 12 has an engagement bracket 50 which protrudes downwards and which is in contact with an engagement tab 52 laterally protruding on the locking mechanism 46. When the connector assembly 12 is in its elevated position as shown in FIG. 6(b), i.e. in the unconnected unlocked position and the locking mechanism 46 is in its recessed position, the engagement tab 52 contacts a frame of the engagement bracket 50; this contact prevents the locking mechanism spring 47 from moving the locking mechanism 46 to its extended position. When the connector assembly 12 is depressed into its connected locked position, the engagement bracket 50 also moves downwards and slides relative to the engagement tab 52 until an opening in the engagement bracket frame is aligned with the engagement tab 52. When this happens, the force of the locking mechanism spring 47 causes the engagement tab 52 to enter into the engagement bracket opening, thereby causing the engagement tab 52 and bracket 50 to engage and lock the connector assembly 12 from movement in the vertical direction, and causing the push button 48 outwards. In this state, the connector assembly 12 is in connected locked position, and the locking mechanism 46 is in its extended position. Pushing the push button 48 will cause the engagement tab 52 to become disengaged with the engagement bracket 50 thereby causing the connector assembly coil springs to move the connector assembly 12 back into its elevated position.

Figure 9B:
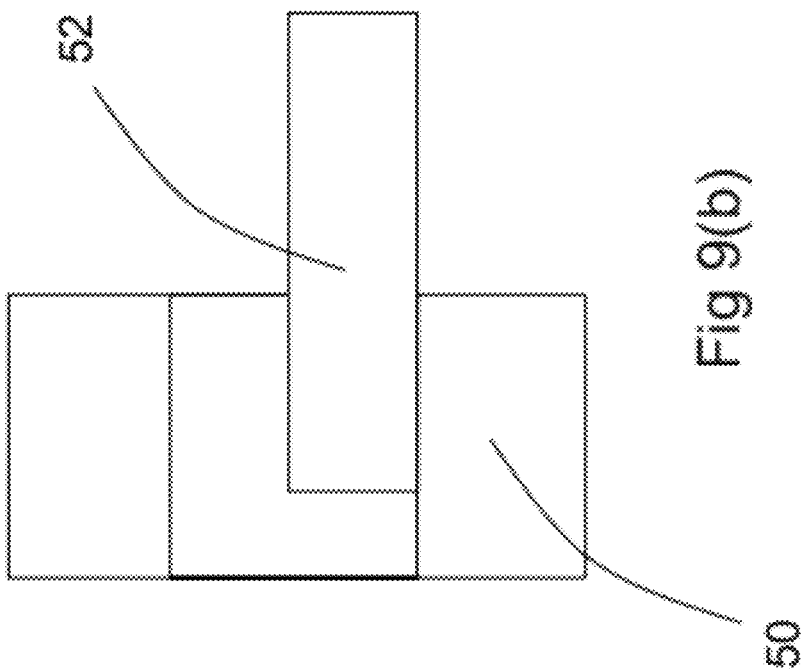
FIGS. 9(a) and (b) are respective front and side sectioned views of one embodiment of an engagement tab of the docking cradle connected to an engagement bracket of the docking cradle.
Figure 9A:
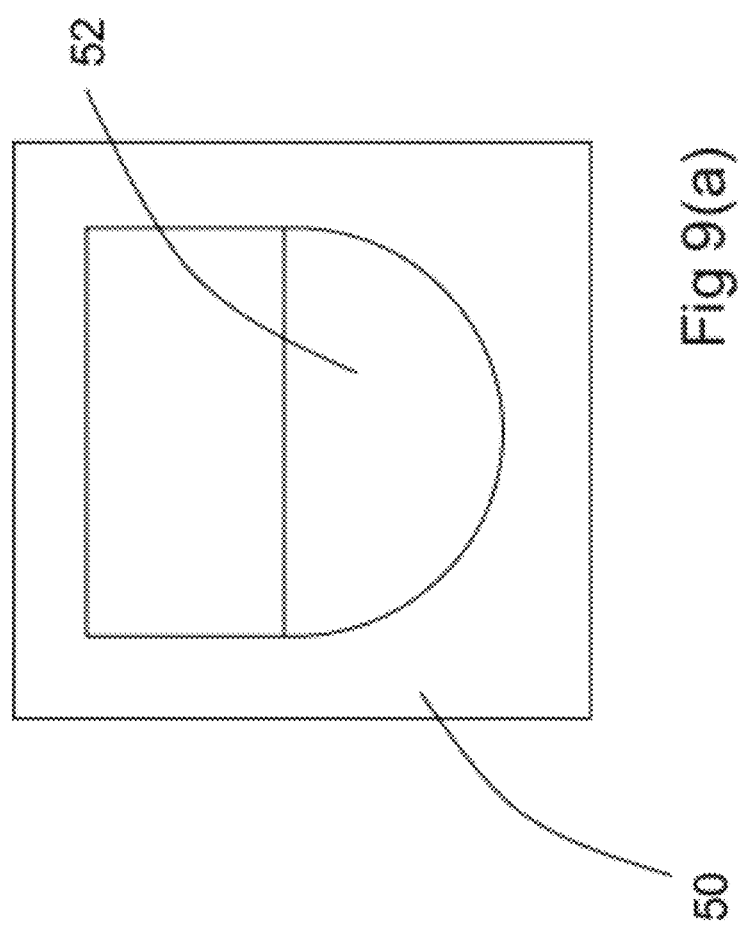

As discussed above, the locking mechanism 46 is constrained to move in fore-and-aft direction only; however, connector assembly 16 can roll and pitch relative to the locking assembly even when the engagement bracket 50 has engaged the tab 52. This is because the engagement bracket opening cross-section is larger than the tab cross-section and thus the engagement bracket 50 can move relative to the tab 52 even when the two are engaged. More particularly and referring to FIGS. 9(a) and (b), the tab 52 in this embodiment has a semi-circular section shape, while the opening on the engagement bracket 50 has a semi-circular bottom section conforming to the tab section and a rectangular top section which provides clearance for the tab to move within the engagement bracket opening, and which allows the connector assembly 16 and the attached mobile computer 100 to roll from side to side around the tab 52. The relatively short length of the tab 52 and its partial extension into the engagement bracket (about ¾ deep) also allows the connector assembly 12 to pitch relative to the base frame 14. FIGS. 10(a) and (b) depict an alternative embodiment of the tab 52 in which the tab 52 has a circular section shape that conforms to the semi-circular bottom section of the engagement bracket 50. The circular section shape of the tab 52 facilitates rolling of the mobile computer 100 around the tab 52.

Therefore, when the connector assembly 12 is in its locked position, it is still free to roll and pitch relative to the base frame 14 and housing 11. This allows the mobile computer 100 docked in the connector assembly 12 to be at least partially isolated from the lateral component of any shock, vibration or other motion applied to the rest of the docking cradle 10. As the pogo pins of the docking cradle electrical interface 16 are spring loaded against the mobile computer electrical interface 110 and the mobile computer 100 is secured in the vertical direction in the docking cradle 10, the vertical component of any shock, vibration, or other motion should not affect the electrical connection between the mobile computer 100 and the docking cradle 10. Also, the multiple teeth 36 that securely clamp to the recessed side rails 112 also impede the mobile computer 100 from become dislodged from the docking cradle 10 by any shock, vibration or other motion.

Alternative Embodiments

While exemplary embodiments of the invention have been illustrated and described, it will be appreciated that various changes can be made therein without departing from the scope and spirit of the invention. For example, while the docking cradle in this embodiment is designed to receive only one mobile computer at a time, the docking cradle can be modified to receive multiple mobile computers at a time, with more than one floating connector assembly that can roll and pitch relative to the locking mechanism.

What is claimed is:

1. A docking cradle for a portable electronic device having an electrical interface, comprising:
   (a) a base frame;
   (b) a connector assembly positioned above the base frame and comprising a platform, an electrical interface on the platform connectable with the electrical interface of the electronic device, a device securing mechanism connected to the platform and connectable to the electronic device to physically secure the electronic device to the connector assembly such that the device and docking cradle electrical interfaces are maintained in contact; and
   (c) at least one connector assembly spring connecting the connector assembly to the base frame such that the connector assembly is movable relative to the base frame;
      wherein the at least one connector assembly spring connects the connector assembly to the base frame such that the connector assembly is movable between an elevated elevation and a depressed elevation, and the docking cradle further comprises a locking mechanism connected to the base frame and connectable to the connector assembly to restrict the connector assembly to roll or pitch or both relative to the base frame when at the depressed elevation; and
   wherein the device securing mechanism comprises at least two longitudinally extending locking arms each pivotably coupled to the platform and pivotable between an unlocked position wherein the electronic device is insertable between the locking arms, and a locked position wherein the arms contact the electronic device thereby securing the electronic device to the connector assembly.

2. A docking cradle as claimed in claim 1 wherein the locking arms each comprise at least two longitudinally spaced and laterally extending locking teeth, the locking teeth engaging corresponding recesses in the electronic device when the locking arms are in their locked position.

3. A docking cradle as claimed in claim 2 further comprising a housing that houses the base frame and the connector assembly, and wherein the base frame is fixedly connected to the housing and the connector assembly is movable within the housing.

4. A docking cradle as claimed in claim 3 wherein the housing comprises a receptacle in which the connector assembly is movable, the receptacle being configured to receive the electronic device therein such that the electronic device is securable by the connector assembly.

5. A docking cradle as claimed in claim 4 further comprising a cam pin for each locking arm and a cam slot in the locking arm, the cam pin being connected to the housing and movable along the cam slot, the cam slot being positioned in the locking arm so that the cam pin movement along the cam slot moves the locking arm into its unlocked position when the connector assembly is in its elevated elevation and moves the locking arm info its locked position when the connector assembly is in its depressed elevation.

6. A docking cradle as claimed in claim 4 wherein the device securing mechanism further comprises springs which bias the locking arms into their locked position and the housing is formed so to guide the locking arms into their unlocked position when the connector assembly is in its elevated elevation.

7. A docking cradle as claimed in claim 5 wherein the device securing mechanism further comprises a support plate positioned above and connected to the platform by at least one support plate spring which biases the support plate against the electronic device when the locking arms are in the locked position.

8. A docking cradle as claimed in claim 7 wherein the electrical interface comprises a power connector or a communications connector or both.

9. A docking cradle as claimed in claim 8 wherein the electrical interface comprises spring-loaded pogo pins.

10. A docking cradle as claimed in claim 9 wherein the at least one support plate spring has a collective stiffness that is less than the collective stiffness of the at least one connector assembly spring.

11. A docking cradle for a portable electronic device having an electrical interface, comprising
   (a) a base frame;
   (b) a connector assembly positioned above the base frame and comprising a platform, an electrical interface on the platform connectable with the electrical interface of the electronic device, a device securing mechanism connected to the platform and connectable to the electronic device to physically secure the electronic device to the connector assembly such that the device and docking cradle electrical interfaces are maintained in contact; and
   (c) at least one connector assembly spring connecting the connector assembly to the base frame such that the connector assembly is movable relative to the base frame;
      wherein the at least one connector assembly spring connects the connector assembly to the base frame such that the connector assembly is movable between an elevated elevation and a depressed elevation, and the docking cradle further comprises a locking mechanism connected to the base frame and connectable to the connector assembly to restrict the connector assembly to roll or pitch or both relative to the base frame when at the depressed elevation; and
   wherein the locking mechanism comprises a laterally movable engagement tab and the connector assembly comprises an engagement bracket, the engagement bracket being vertically aligned with the tab when the connector assembly is in the depressed elevation, and the connector assembly being locked in the depressed position when the tab is moved laterally to engage with the aligned engagement bracket.

12. A docking cradle as claimed in claim 11 wherein the engagement bracket and tab have a curved profile such that the engagement bracket can roll relative to the tab when the tab is engagement with the engagement bracket.

13. A docking cradle as claimed in claim 12 wherein the tab extends only partially into the engagement bracket when engaged with the aligned engagement bracket, thereby enabling the connector assembly to pitch relative to the base frame.

14. A docking cradle for a portable electronic device having an electrical interface, comprising (a) a base frame;

(b) a connector assembly positioned above the base frame and comprising a platform, an electrical interface on the platform connectable with the electrical interface of the electronic device, a device securing mechanism connected to the platform and connectable to the electronic device to physically secure the electronic device to the connector assembly such that the device and docking cradle electrical interfaces are maintained in contact; and (c) at least one connector assembly spring connecting the connector assembly to the base frame such that the connector assembly is movable relative to the base frame;

wherein the at least one connector assembly spring connects the connector assembly to the base frame such that the connector assembly is movable between an elevated elevation and a depressed elevation, and the docking cradle further comprises a locking mechanism connected to the base frame and connectable to the connector assembly to restrict the connector assembly to roll or pitch or both relative to the base frame when at the depressed elevation; and wherein the locking mechanism further comprises a spring connecting the locking mechanism to the base frame, and laterally biasing the tab against engagement bracket, such that when engagement bracket is vertically aligned with the tab, the spring moves the tab into engagement with the engagement bracket.

15. A docking cradle as claimed in claim 14 wherein the locking mechanism further comprises a push button extending through an opening in the housing and which is pushable to disengage the tab from the engagement bracket.

* * * * *

UNITED STATES PATENT AND TRADEMARK OFFICE
CERTIFICATE OF CORRECTION

| | | |
|---|---|---|
| PATENT NO. | : 8,241,050 B2 | Page 1 of 1 |
| APPLICATION NO. | : 12/765984 | |
| DATED | : August 14, 2012 | |
| INVENTOR(S) | : Xu et al. | |

It is certified that error appears in the above-identified patent and that said Letters Patent is hereby corrected as shown below:

In Column 1, Line 36, delete "an" and insert -- a --, therefor.

In Column 6, Line 8, delete "springs" and insert -- springs. --, therefor.

In Column 6, Line 11, delete "pin 44" and insert -- pin 42 --, therefor.

In Column 10, Line 13, in Claim 5, delete "info" and insert -- into --, therefor.

In Column 10, Line 37, in Claim 11, delete "comprising" and insert -- comprising: --, therefor.

In Column 11, Line 12, in Claim 14, delete "comprising" and insert -- comprising: --, therefor.

Signed and Sealed this
Second Day of April, 2013

Teresa Stanek Rea
*Acting Director of the United States Patent and Trademark Office*